United States Patent [19]

Clausing

[11] 4,183,073
[45] Jan. 8, 1980

[54] SHUTTER FOR DISCONNECT CONTACTS OF CIRCUIT BREAKER CUBICLE

[75] Inventor: Challiss I. Clausing, Marlton, N.J.

[73] Assignee: Gould Inc., Rolling Meadows, Ill.

[21] Appl. No.: 923,908

[22] Filed: Jul. 12, 1978

[51] Int. Cl.² .............................................. H02B 1/14
[52] U.S. Cl. .............................. 361/345; 200/50 AA; 200/304
[58] Field of Search .............. 200/50 A, 50 AA, 304; 361/345, 337, 339

[56] References Cited

U.S. PATENT DOCUMENTS

| 1,718,501 | 6/1929 | Trencham | 361/345 |
| 3,614,350 | 10/1971 | Eichelberger | 361/345 |

Primary Examiner—Gerald P. Tolin

Attorney, Agent, or Firm—Ostrolenk, Faber, Gerb & Soffen

[57] ABSTRACT

A shutter for a circuit breaker compartment in which the upper and lower stationary back disconnect contacts at the rear of the compartment are protected, as the circuit breaker is withdrawn from the compartment by a clam-shell shutter. The two halves of the shutters are biased toward closed position; a circuit breaker operates a cam end of a bell crank lever to open the clam-shell as the circuit breaker moves toward the rear of the compartment. The insulated rear wall has openings through which the stationary back disconnect contacts are accessible. The rear wall is curved at the openings for the contacts to correspond with the curvature of the clam-shell halves and to provide added guidance and support.

9 Claims, 14 Drawing Figures

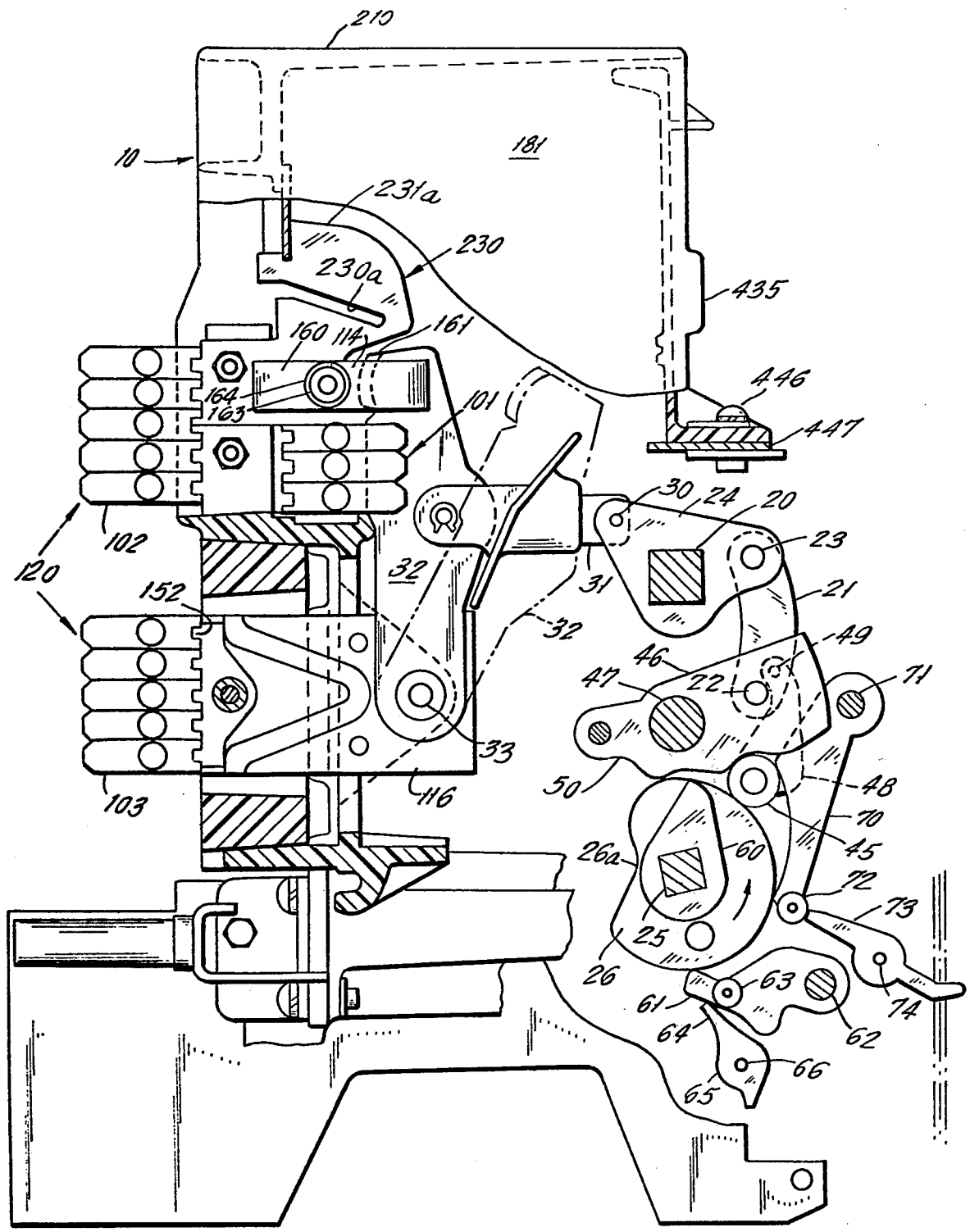

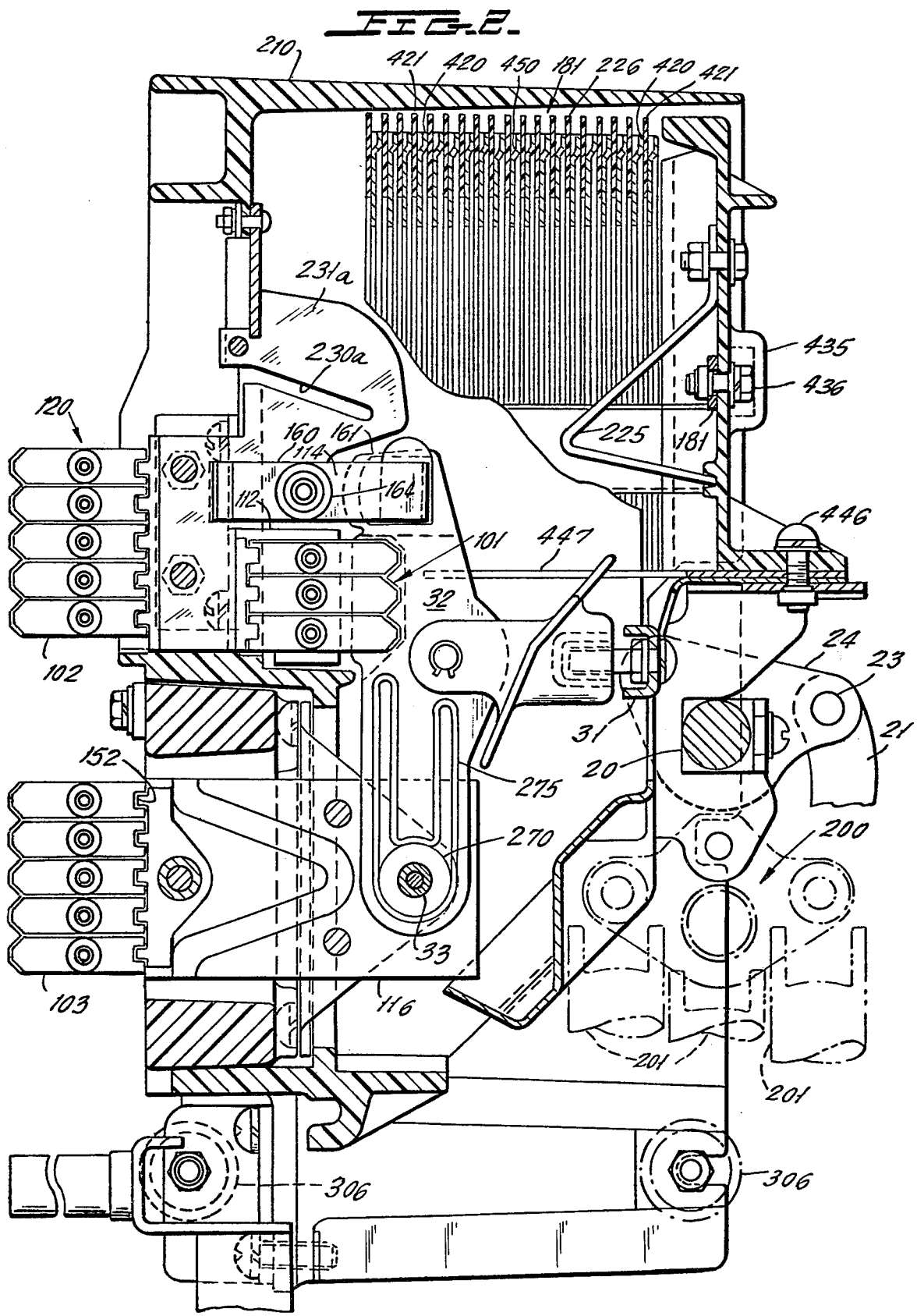

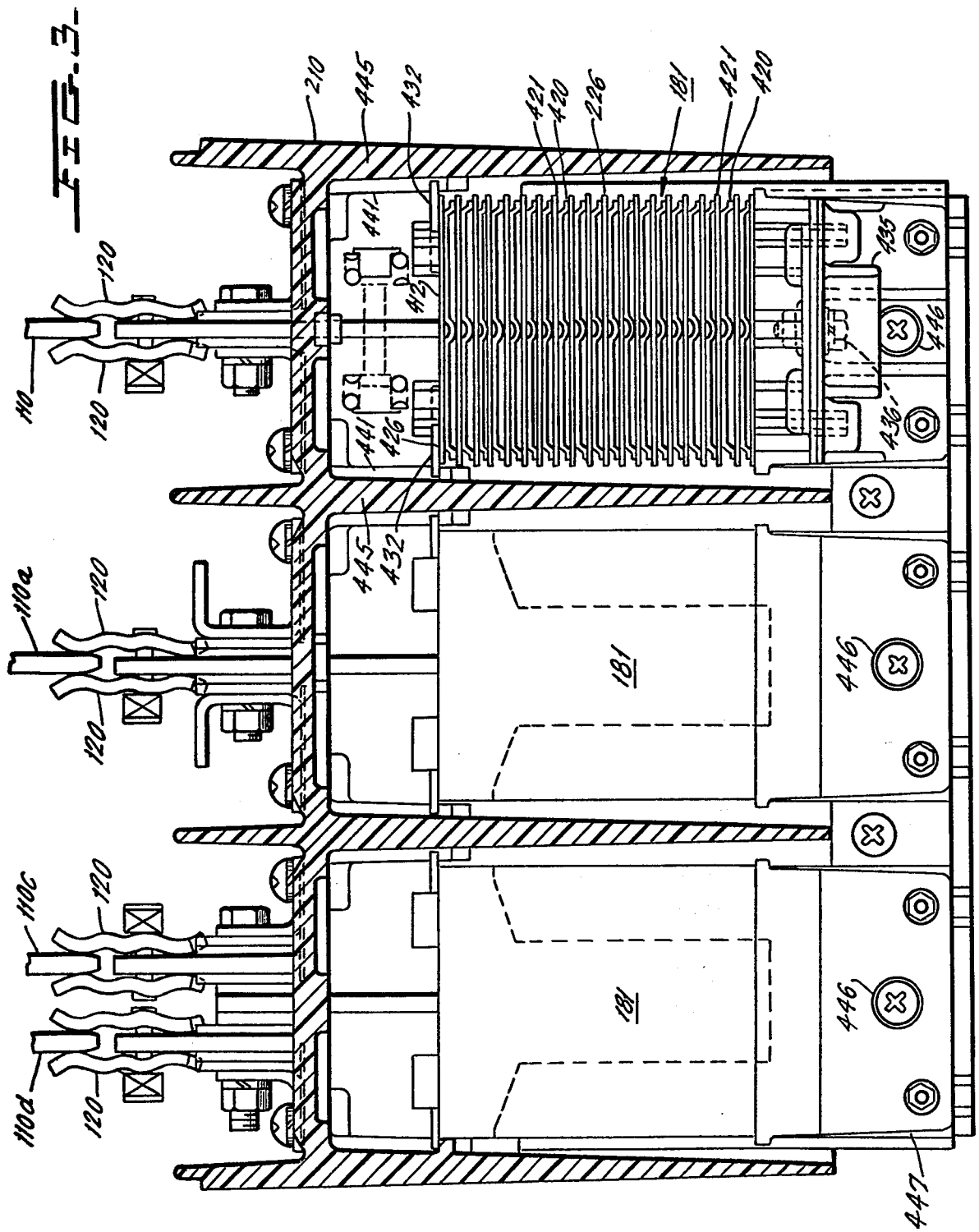

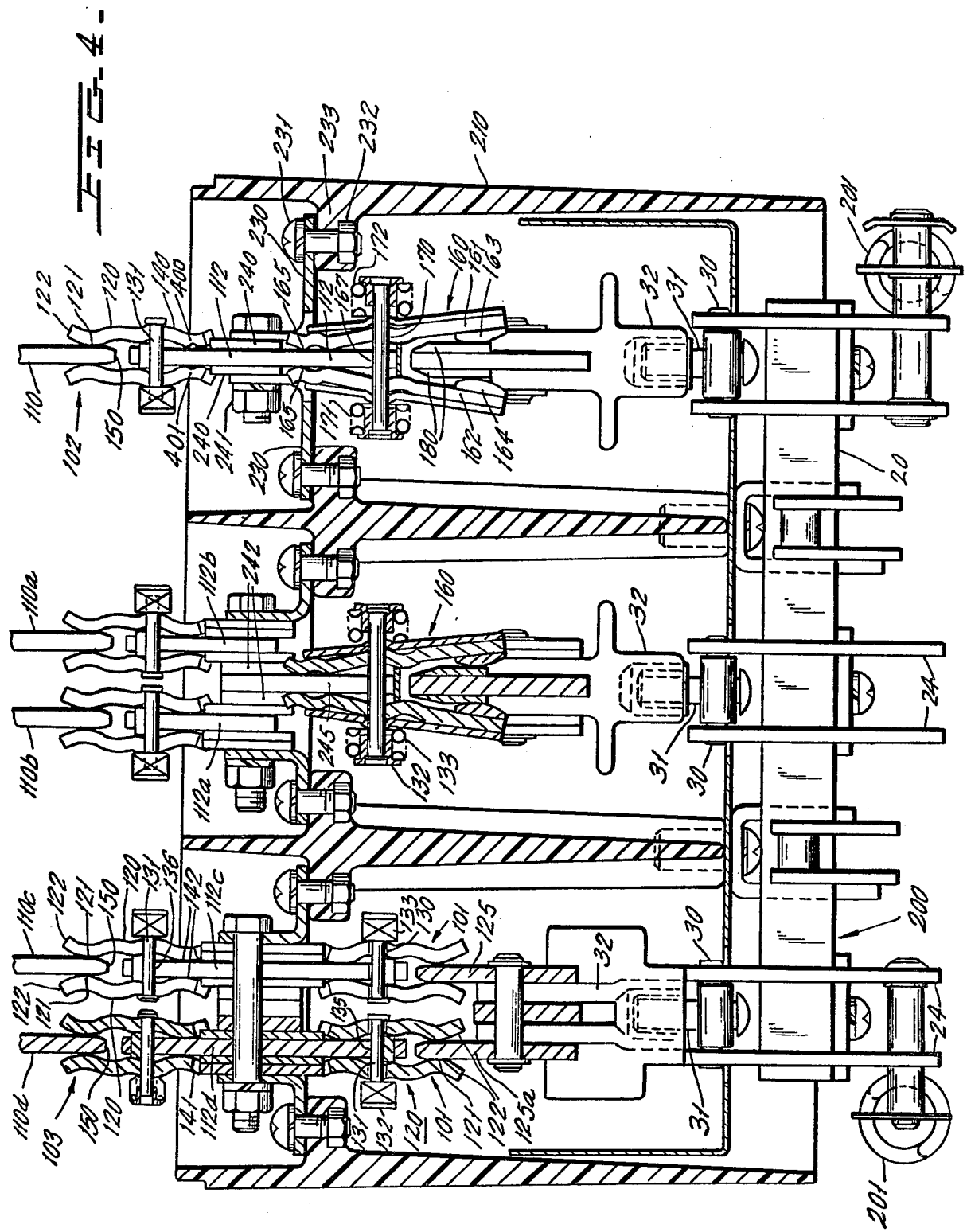

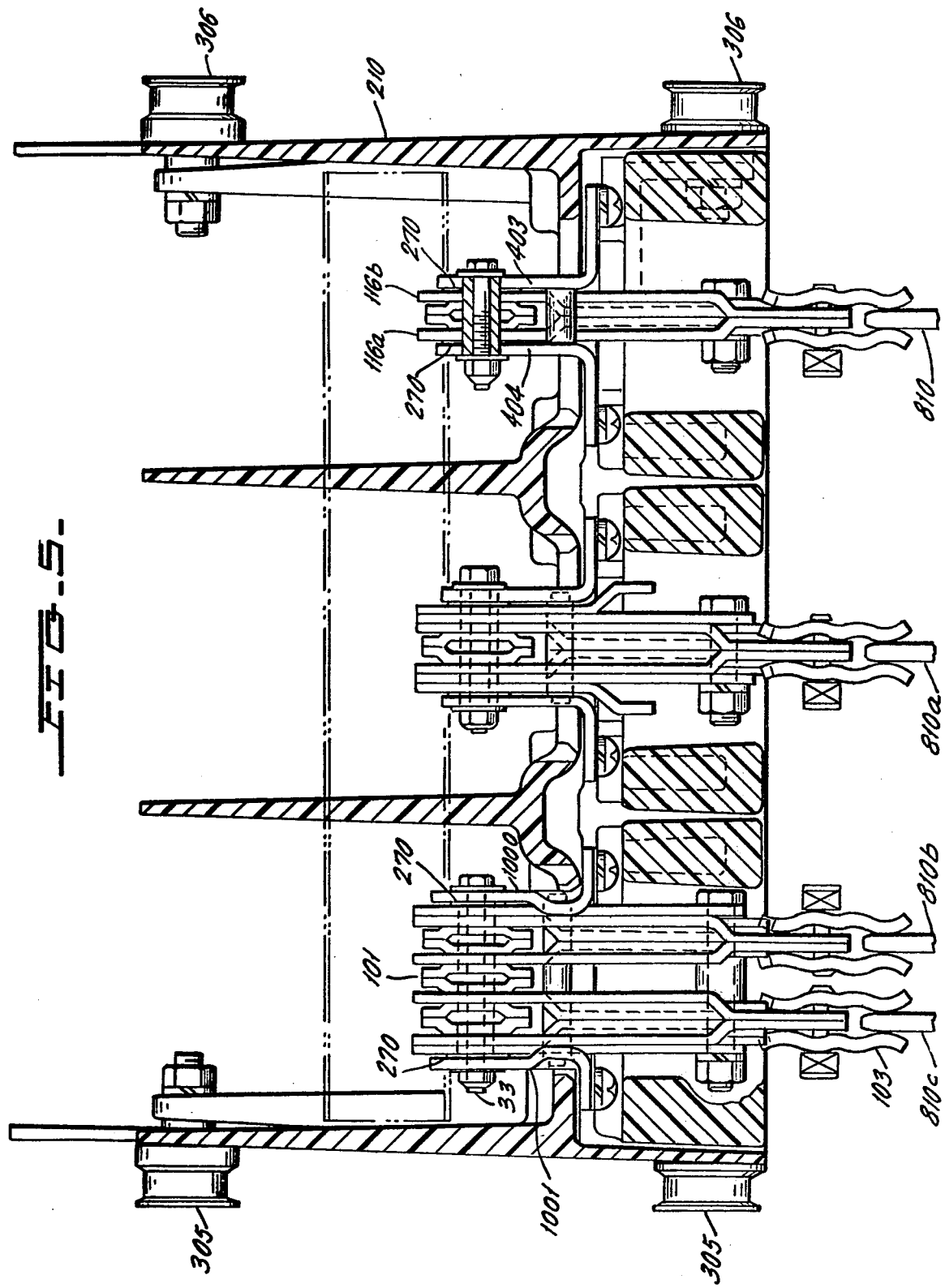

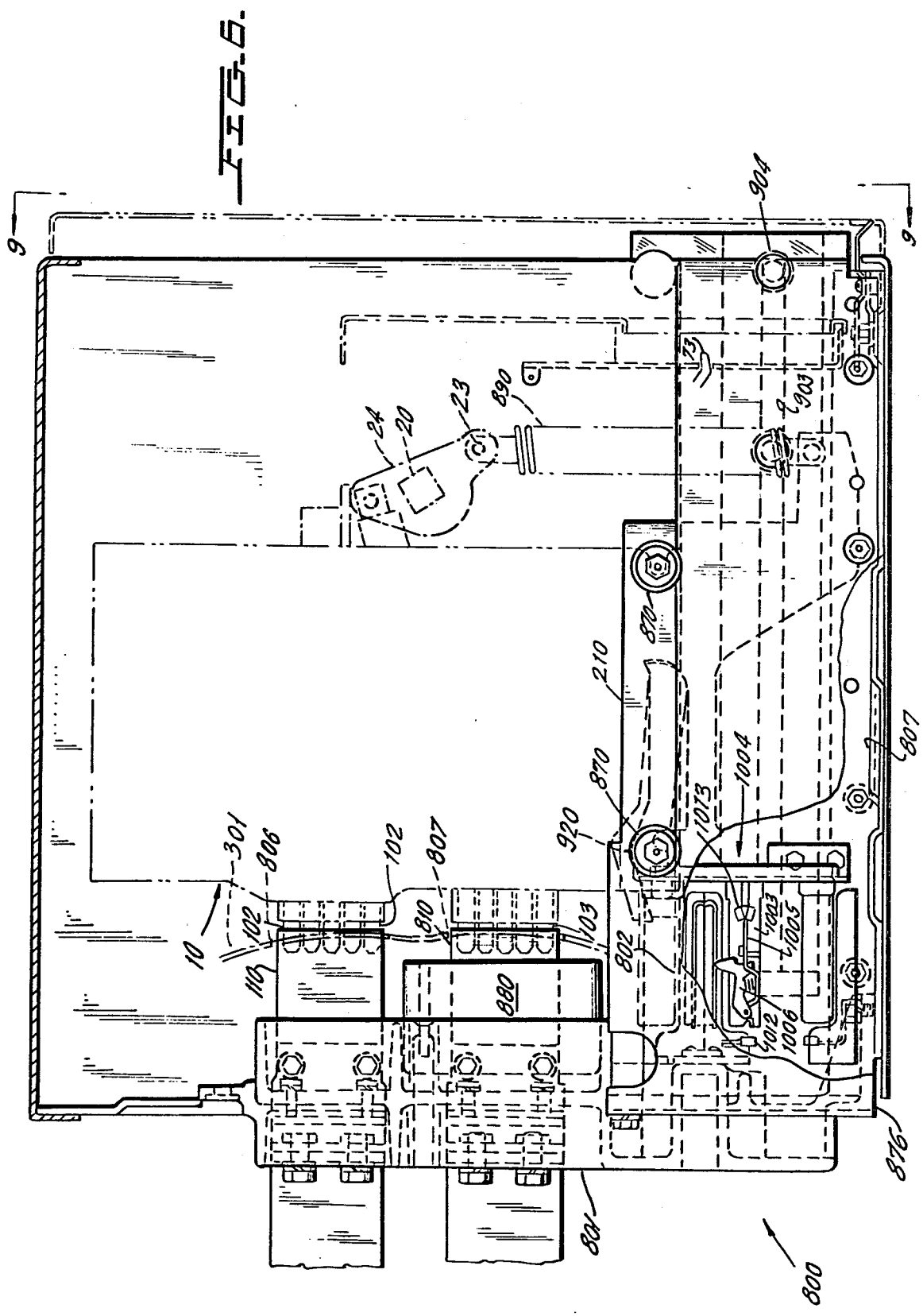

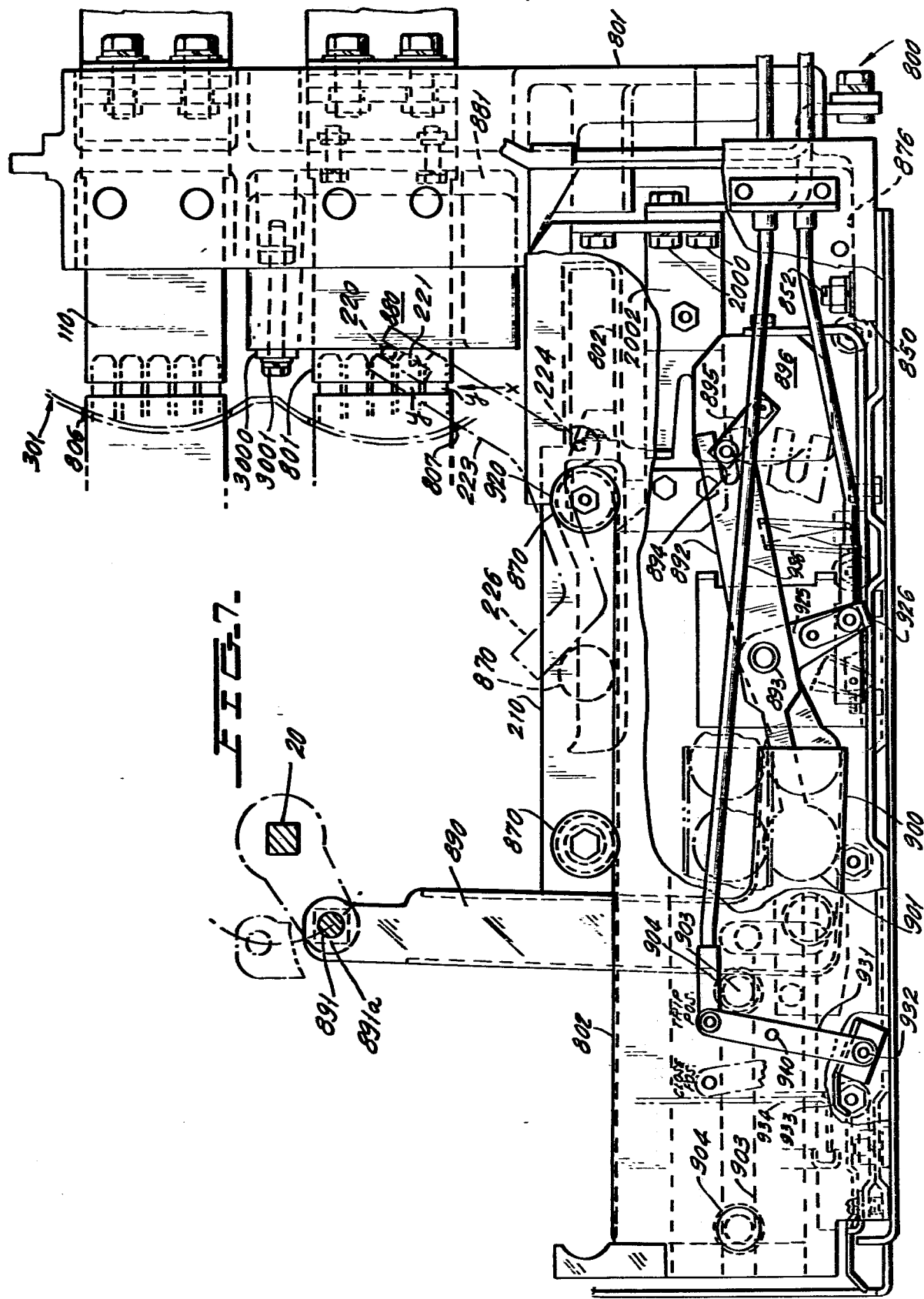

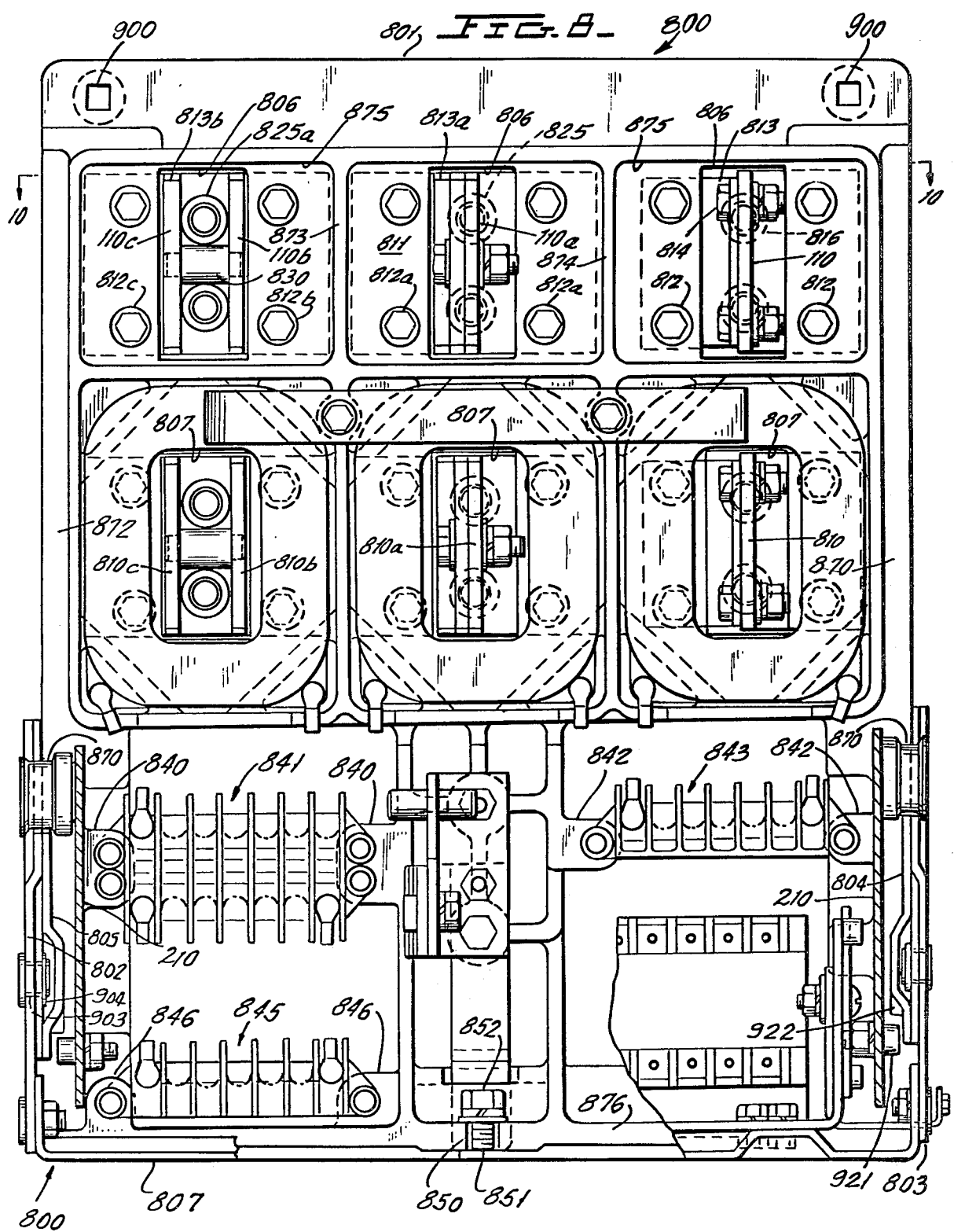

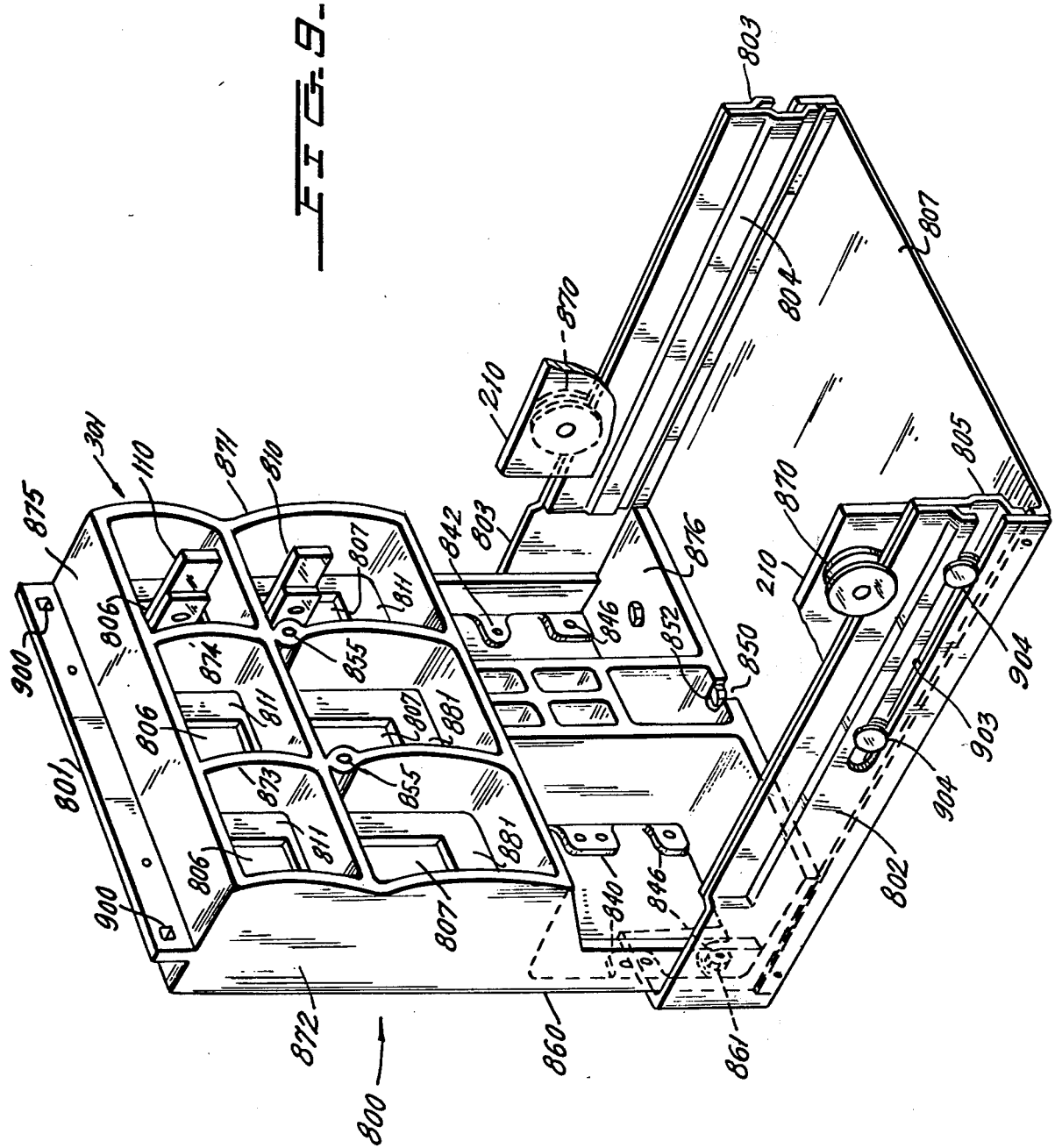

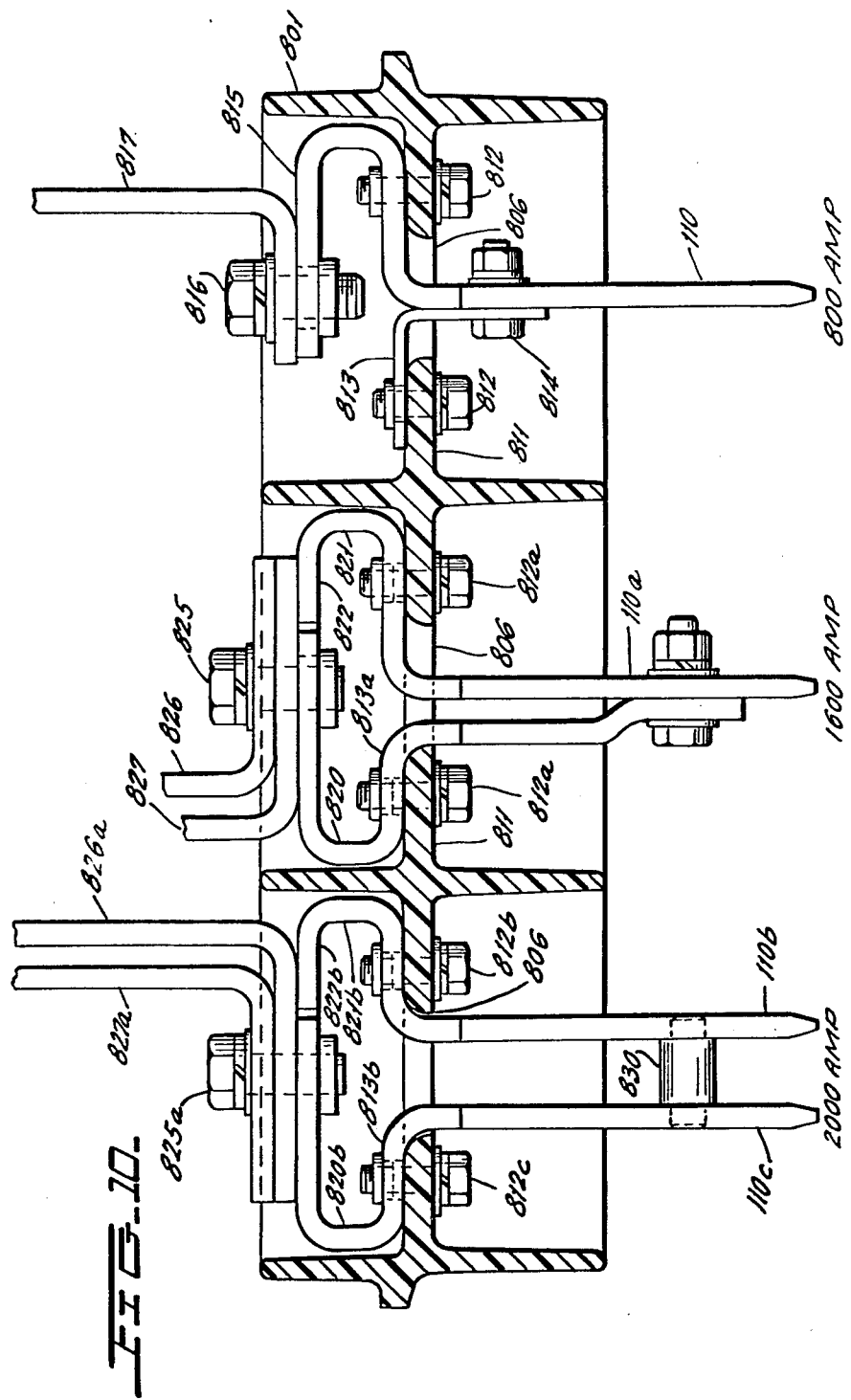

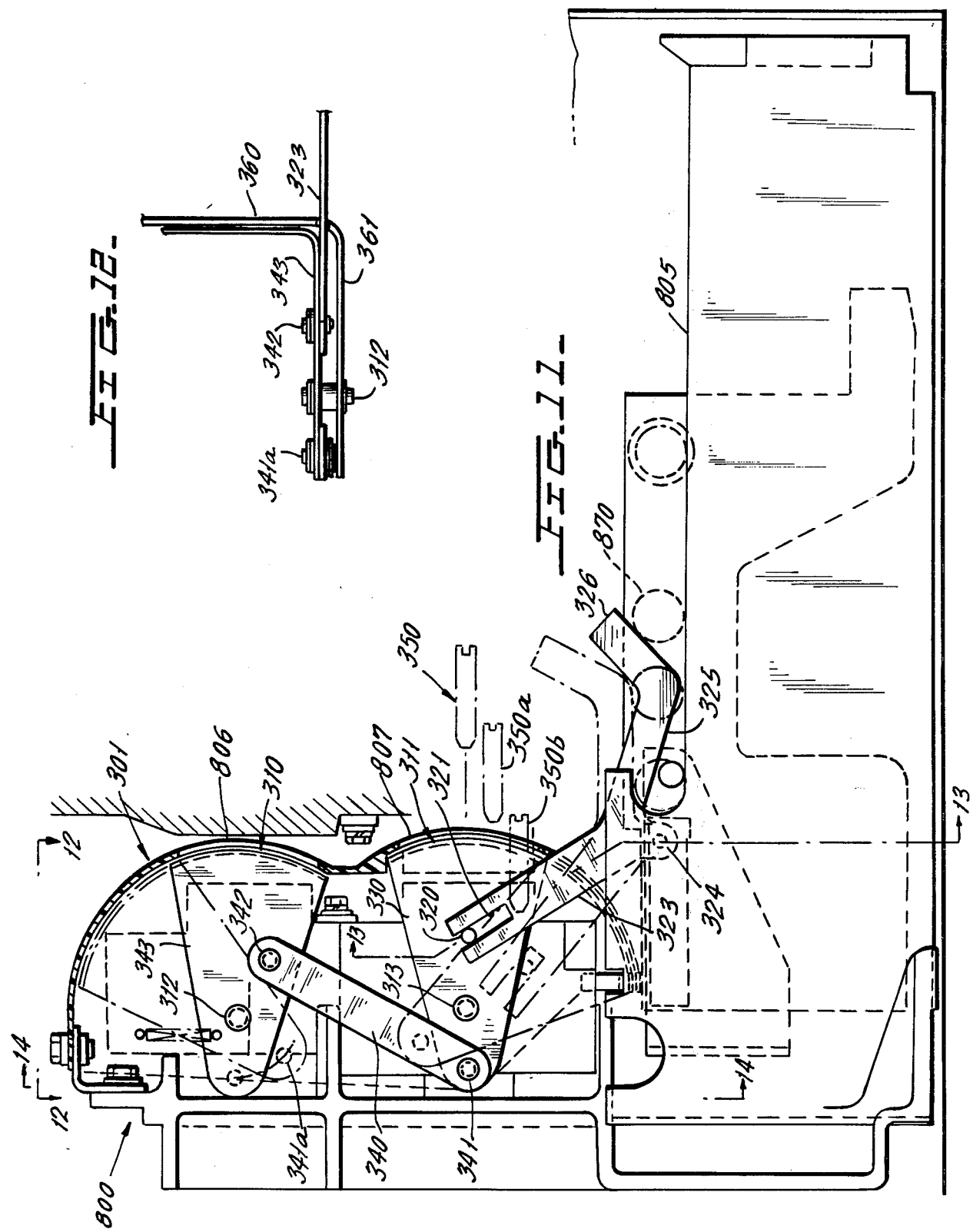

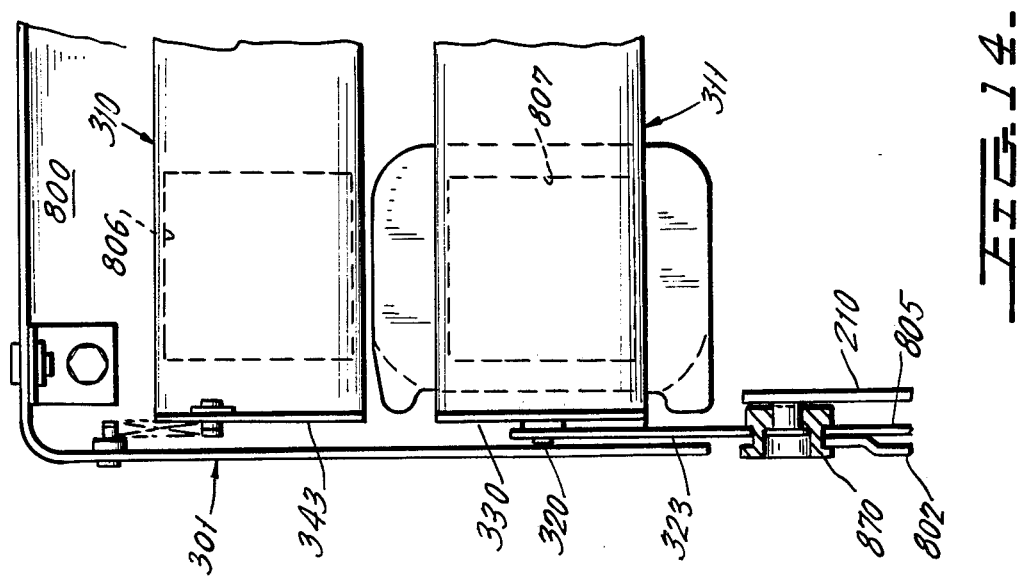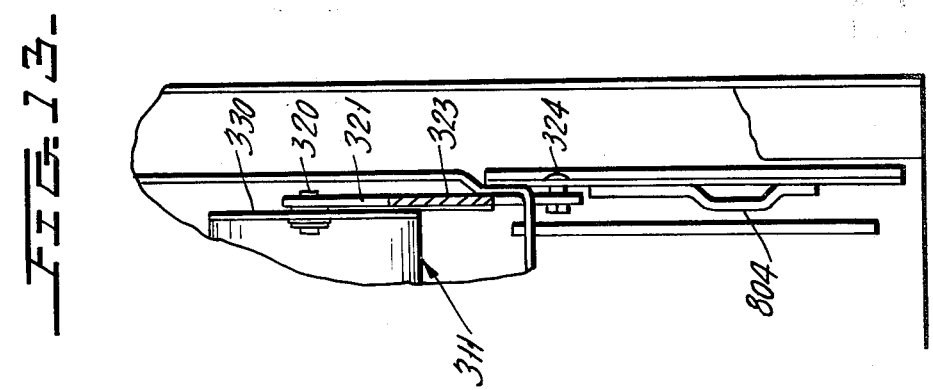

SHUTTER FOR DISCONNECT CONTACTS OF CIRCUIT BREAKER CUBICLE

The present invention relates to draw out circuit breakers and more particularly to an automatic shutter for a circuit breaker enclosure which will automatically close the openings through which the stationary disconnect contacts in the enclosure are accessible when the circuit breaker is drawn toward the front of the enclosure. When the circuit breaker is moved toward the rear of the cubicle the movement of the circuit breaker will, as the disconnect contacts of the circuit breaker approach the rear of the cubicle, cause the shutter to open and thereby make the stationary disconnect contacts in the cubicle available for engagement by the disconnect contacts of the circuit breaker.

Metal shutters for closing off access to stationary disconnect contacts are known in draw out circuit breakers. The circuit breaker to which the shutter of the present invention will be applied may operate at the order of 600 volts A.C. Such shutters were not deemed to be necessary in the past; but, under modern conditions and the modern attitude toward absolute safety, the utilization of a metal shutter even at such lower voltages is regarded as desirable and in some cases may become mandatory.

Various methods have been used to employ and operate shutters for closing off access to the stationary disconnect contacts in the cubicle. These have included devices which on movement of the circuit breaker will be caused to move up or down, usually, a single unit is moved with respect to the customary six sets of stationary disconnect contacts. Shutters have at times had angular motion rotating about a fixed pivot in such a manner as to close the access to the stationary disconnects when the circuit breaker is withdrawn and to rotate to open when the circuit breaker is driven into the cubicle.

The present invention has for its object an improvement in the shutter concept wherein the shutter will essentially constitute a clam shell type of arrangement in which one shutter will operate for the three upper poles and the other shutter will operate for the three lower poles, both shutters being operated simultaneously by the movement of the circuit breaker.

Another object of the present invention is to arrange the shutter operating mechanism so that no additional elements are required on the circuit breaker itself in order to actuate the shutter mechanism.

Because of the split clam-shell arrangement, each of the shutter halves is smaller and lighter but nevertheless offers full protection for the disconnect contacts.

The foregoing and many other objects of the present invention will become apparent in the following description and drawings in which:

FIG. 1 is a schematic side view of a draw out circuit breaker in connection with which the present invention may be used.

FIG. 2 is a detailed side view of the circuit breaker.

FIG. 3 is a top view of the circuit breaker showing the circuit breaker in fully racked-in position.

FIG. 4 is a cross-sectional view showing the upper contacts of the circuit breaker which may be used in connection with the shutter of the present invention and the manner of their connection in the cubicle to the current supply.

FIG. 5 is a cross-sectional view showing the lower contact terminals and their relationship to the cubicle and the cradle and showing also the rollers of the circuit breaker which will ride on the track in the cradle.

FIG. 6 is a side view of the circuit breaker mounted in its cradle showing the circuit breaker mounted in place in the cubicle in which the cradle is contained.

FIG. 7 is a detailed view corresponding to that of FIG. 6 but also showing the side of the circuit breaker in its cradle and the relationship of the circuit breaker to the shutter.

FIG. 8 is a front view of the cradle molding assembly which actually supports the stationary disconnect contact elements within the cubicle as well as the auxiliary switches and other elements of the structure of the cradle.

FIG. 9 is a schematic view in perspective showing how the rail structure of the cradle forms the structural base for the entire cradle which is itself secured in the cubicle in order to receive the circuit breaker.

FIG. 10 is a view in cross-section taken from line 10—10 of FIG. 8 looking in the direction of the arrows and showing the upper terminals supported in the cradle.

FIG. 11 is a side view section showing the structure and operation of the shutter of the present invention.

FIG. 12 is a view taken from line 12—12 of FIG. 11 looking in the direction of the arrows.

FIG. 13 is a view partly in section taken from line 13—13 of FIG. 11 looking in the direction of the arrows.

FIG. 14 is a view partly in section taken from line 14—14 of FIG. 11 looking toward the rear of the cubicle.

Referring first to FIGS. 1—5, there is here shown essentially the circuit breaker previously described in prior application Ser. No. 869,777 filed Jan. 16, 1978. This circuit breaker is also mounted on the molded support described in application Ser. No. 869,589 filed Jan. 16, 1978, and more specifically described therein, the molded support being part of the circuit breaker itself, and providing the means for positioning and carrying the various parts of the circuit breaker so that they may be moved into the cubicle and into the cradle of the present invention.

A full understanding of the present invention requires a brief description of the circuit breaker itself shown in FIGS. 1 to 5. Referring first to FIG. 1, the circuit breaker is here shown schematically in the position in which the contacts are closed and the closing springs are fully discharged. The type of circuit breaker which is here referred to is fully described in applications Ser. Nos. 735,017, 734,955, now U.S. Pat. No. 4,101,744, and 735,040, now U.S. Pat. No. 4,146,765, all filed Oct. 12, 1976. The circuit breaker there described is a circuit breaker in which a plurality of closing springs are utilized to drive the circuit breaker from an open position to a closed position. Accordingly, a motor is provided which will first charge the springs; the springs are latched in the charged position. When the contacts of the circuit breaker are open and are later to be closed, the latch which retains the closing springs in the charged position is released so that the springs may operate directly to close the contacts to the circuit breaker. After the contacts are closed, the springs may be recharged.

Since the invention is directed to the shutter structure, the spring charging structure and racking structure need not be described in detail and the contact operating structure need be described to the extent only that it is necessary to understand the relationship of the structure of the circuit breaker to the disconnect contacts and the shutter.

The shaft 25 is driven counterclockwise in the direction indicated by the arrow in FIG. 1 in order to charge the closing springs. For this purpose, an appropriate connection from a motor or handle is made to the shaft 25 to perform the operation. On the closing of the circuit breaker, an appropriate latch as described in the said prior applications is set to prop the basic support members while nevertheless leaving the circuit breaker trip-free but arranging the circuit breaker so that it will not accidentally be opened by operation of the closing springs upon recharge. The closing springs can be discharged only when the breaker is open.

The latch member 60 carried by shaft 25 is driven onto the prop latch 61 in a position not shown in FIG. 1 (but shown in FIG. 5b of the last mentioned prior applications). The prop latch 61 is pivotally mounted on the stationary pivot 62 and is provided with the latch roller 63 which is supported by the closing latch 64. The closing latch 64 is an extension of the bell crank lever 65 which is pivoted on the stationary pivot 66. This latch structure provides a support for retaining the springs in charged condition while the contacts are open and after the contacts are closed preparatory to another closing operation.

In FIG. 1, the structure is shown in the condition in which the contacts are closed and the springs have been discharged; in other words, the closing latch 64 has been rotated so that it no longer supports the latch roller 63 and thus, no longer supports the prop latch 61 and thereby no longer supports the latch member 60 on the shaft 25. Latch member 60 has now rotated clockwise to the position where the springs have been discharged in order to close the circuit breaker. Therefore, the position shown in FIG. 1 is one in which the circuit breaker is closed and the springs are fully discharged.

Upon the discharge of the closing springs, which is the condition shown in FIG. 1, the shaft 25 is rotated to the position shown in FIG. 1, and the first cam 26 operates through roller 45 to rotate the third closing cam 46 in a counterclockwise direction around its pivot 47. The roller 45, supported on the arm 48 which is supported on the pivot 49, is a part of the cam 46. The end of the third closing cam 46 opposite to that which is engaged by the roller 45 is provided with a recess 50 which engages an additional roller related only to the spring closing operation, and described in the prior applications and need not be described here.

The second closing cam 70 is stationarily pivoted on the pivot 71 and is provided with the latch roller 72 which bears against the tripping latch 73 rotatably mounted on the pivot 74 and spring biased toward the position shown in FIG. 1. Thus, as the springs are charged, shaft 25 is rotated counterclockwise until member 60 is blocked by the prop latch 61, member 60 is then in a position 180° opposite to the position shown in FIG. 1. The prop latch 61 is in turn supported by the engagement of the latch roller 63 with the closing latch 64. This, again, is the condition when the closing springs are fully charged.

In the condition of the circuit breaker with the contacts open and the springs charged, recess 26a of cam 26 on shaft 25 engages the roller 45. The roller 45 is driven up onto the outer perimeter of cam 26 thereby raising the cam 46 around its pivot 47 and following a path defined by the cam 26 and the second closing cam 70. The engagement of latch 73 with latch roller 72 establishes the position of cam member 70 and the track for roller 45 so that roller 45 is guided in a path which will lift the cam 46 around the pin 47. Link 21 connected at 22 to the cam 46 is connected at 23 to the bell crank arm 24 secured on the jack shaft 20. The opposite end of bell crank arm 24 is connected by pin 30 to the extension 31 of the contact arm 32. It will here be noted that the contact arm 32 is maintained in the closed position by the latch 73 engaging the roller 72 and positioning the roller 45 and arm 48 so that the cam 46 is maintained in the raised position to drive the bell crank lever 24 counterclockwise in the direction to maintain the contact arm 32 closed.

The contact elements forming the contacts 101, 102, 103 are arranged so that the main stationary contact elements 101 and the main disconnect contact elements 102, 103 are identical in construction thereby eliminating the total number of different parts which must be fabricated in order to construct the circuit breaker.

In the instance illustrated in FIGS. 1 and 2, the stationary contacts 101 are shown with three pairs of jaws while the disconnect contacts 102, 103 are shown with five pairs of jaws. The number of pairs of jaws utilized for the contact elements depends on the current rating and the desired current carrying capacity.

Should a larger capacity breaker be required, such as 2000 ampere breaker, then two sets of upper and lower disconnect contacts having five pairs of jaws each may be used.

It should be noted in FIGS. 3, 4 and 5 that while circuit breakers of different capacities are shown mounted in the three-pole structure, in any particular use the circuit breaker structures for each of the poles are of the same capacity. The showing of circuit breakers of three different capacities mounted in the three different sections of a single three-pole circuit breaker in FIGS. 3, 4 and 5, is for the purpose of demonstrating that the same housing and the same structure may be utilized for circuit breakers of varying capacity, both in their operating capacity such as 800 ampere, 1600 ampere, 2000 ampere breakers, as well as in current interrupting capacity.

As seen particularly in FIG. 4, current enters through the upper back connection stud 110 in the enclosure. In the case of a higher capacity circuit breaker, where a plurality of sets of disconnect contacts can be required, the back connection structure or terminal may be modified as shown at 110a, 110b to provide a double path for the current. Similarly, for an even larger capacity circuit breaker enclosed in the same structure, somewhat heavier back connection terminals or studs 110c, 110d may be utilized. Current then passes (FIGS. 1 and 2) through the disconnect contacts 102 to the stationary contact support structure 112, then through the stationary contacts 101 and the stationary arcing contact 114 to the movable contact arm or contact bridge 32 which is pivotally mounted at the pivot 33 on the lower connector and contact mounting structure 116. Current then passes through the lower disconnect contacts 103 to the stationary terminal 110 in the housing.

The disconnect contacts 102, 103 and the stationary contacts 101 are so arranged that they are identical in construction so that each member of the pairs of jaws forming the plurality of contact elements is identical. This, therefore, simplifies the fabrication of the circuit breaker elements. Each of the individual elements 120 forming the various contacts 101, 102, 103 as shown in FIGS. 1, 2, 3, and 4 is composed of a substantially elongated member having from the side view (visible more clearly in FIGS. 1 and 2), a substantially elongated rectangular appearance, and, from the top or edge view, as seen more particularly in FIGS. 3 and 4, a plurality of curvatures designed to provide appropriate hinging contact pressure on the contact surfaces. Each of the contact elements 120 (FIG. 4) is provided with a separable contact surface 121 adjacent the end 122 thereof. The end 122 thereof flares flatly away from the contact surface 121 thereby providing a pivot with respect to which the contact members 120 will move. With respect to the disconnect contacts at the rear of the circuit breaker, the pair of members 120 facing each other also have their contact surfaces 121 facing each other and the flare at the end 122 provides easy entry of the stationary cubicle stud 110c between the contacts surfaces 121 of the respective contacts elements 120. At the stationary circuit breaker contacts 101, 101, the elements 120 are reversed so that the contact surface 121 of each of them is directed toward the blades 125, 125a of the movable bridge or contact 32. This, again, provides easy access for the contact elements 125, 125a through the flared section formed by the elements 122, 122 of the stationary contact elements 120 between the said contacts.

The members 120 extend in one direction on the circuit breaker toward the rear of the circuit breaker for easy connection to the stationary cubicle contacts 110 while they extend in the opposite direction on the circuit breaker toward the front of the circuit breaker for easy connection to the movable contact structure 32.

Each of the members 120 is provided with an opening 130, 130 through which a pin 131 may be passed and an appropriate retainer 132 on the pin 131 compresses a spring 133 in order to provide appropriate contact pressure between two matching members 120. The pin 131 also serves to mount the contact structure for the stationary contact of the circuit breaker on the connection member or circuit breaker internal bus 112; opening 135 is provided at the forward or right-hand end of the circuit breaker internal bus 112 (see FIG. 5), so that the pin 131 may pass therethrough and secure the contacts in place. Similarly, at the rear end of the internal bus 112 of the circuit breaker, an opening 136 is provided for the rear pin 131 in order to secure the contact members for the disconnect contacts 102 in place. Each of the contact members 120 is provided with an outwardly directed bend or boss 140 at the point where the pin 131 passes through the same; the contact elements 120 are so curved that the compression spring between them forces the contact sections 121 toward each other and also forces the stationary contact sections 142, 142 toward each other.

The upper stationary internal bus 112 of the circuit breaker for instance is thus provided with the rear disconnect contact structure 103 by the engagement of contact surfaces 142, 142 of the facing contact members 120, 120 with the internal circuit breaker bus 112.

The contact members 120, 120 are driven toward each other by the compression spring 133 which not only drives the contact surfaces 142, 142 into engagement with the internal circuit breaker bus 112, but also drives the contact surfaces 121, 121 of the contacts 120 toward each other in order to establish appropriate contact with the stationary or cubicle stud 110.

The flare provided by the bending out of the ends 122 at each end makes it possible when the circuit breaker is inserted into the cubicle for the contact surfaces 121, 121 of the contact 120 facing toward the rear to be spread apart by the chamfered end 150 of the stationary stud 110 to enter upon the surface of the stud 110 on each side and the compression spring establishes appropriate contact.

For ease in assembly of the circuit breaker contacts and in order to avoid misalignment during assembly, as seen particularly in FIGS. 1, 2 and 4, the contact members 120 are notched at their rear or "stationary" end at the notch 152 to indicate readily which part of the contact structure is to be stationarily and permanently secured to the contact carrying member.

In addition to the stationary contacts 101 described in connection with FIGS. 1, 2 and 4, the circuit breaker upper connection bus 112 carries an additional pair of arcing contacts 160 which engage with the arcing contact section 161 of the contact bridging arm 32. This arcing contact section is more readily seen in the upper right-hand and center poles of FIG. 4 wherein the stationary arcing contact 160 operates in substantially the same manner as one of the elements 120 of the main contact 101 or disconnect contacts 102, 103, except that it is larger and is made of a material which is better adapted to resist the arc.

The stationary arcing contact 160 comprises two identical contact members 161, 162, which are arranged to face each other and have at the end thereof, facing the movable contact arm, arcing contact elements 163, 164. The opposite end of the arcing contact members 161, 162 are provided with contact surfaces 165, 165, which engage the upper internal bus 112 of the circuit breaker leading to the upper disconnect contact section 102.

An opening 167 in the upper internal bus 112 of the circuit breaker carries the pin 170 which passes also through appropriate openings in the arcing contact elements 161, 162, and positions compression springs 171, 172 on each side against the arcing contact elements 161, 162, thereby driving them toward each other and against the movable arcing contact 180, 180 carried by the contact bridging arm 32. The length of the stationary arcing contact 160, and the arrangement of parts is such that, when the movable contact arm 32 moves from the solid line position of FIG. 1 to the dotted line position of FIG. 1, current is transferred from the stationary contact 101 to the stationary arcing contact 160. This is so because the separation of the movable contact arm 32 and the stationary circuit breaker contact 101 occurs first.

The arc is then drawn between the arcing contact elements 163–164 and 180 and is then moved up appropriately into the arc chute 181 where it is extinguished.

In FIG. 2, the circuit breaker mechanism including the shaft 20 which operates the moving contact arm 32, is shown as well as the operating link 21. There is also indicated at 200 the elements related to the spring charging mechanism for the charging of the springs 201, 201. No specific description of this structure is herein contained because it is described in the above-mentioned prior pending applications.

The cradle of the circuit breaker when it is positioned in the enclosure to receive the circuit breaker may be understood from FIG. 9, as well as FIGS. 6, 7 and 8. The cradle 800 as shown in these figures comprises a basic support molding 801 and the stationary side rails 802, 803 which constitute the fixed track and which are connected to and support the extendable track 804, 805, on each side. The molding 801 is provided with a set of openings 806, 806, for the upper stationary contacts 110, and a set of openings 807, 807 for the lower stationary contacts 810, as shown in FIG. 8, 9 and 10.

The upper contact members 110 are secured to the portions 811, 811, surrounding each of the openings 806 by bolts 812, which go through the section 811 of the molding 801 to the L-shaped strap 813. The L-shaped strap 813 is connected by bolt 814 of the connector 110. The connector 110 is provided as a U-shaped structure at 815 which is connected by the bolt and nut arrangement 816 to the switchboard lead 817.

In FIGS. 8 and 10, various types of such connections are shown. Thus, the connection shown on the right-hand side and thus far described is the connection which is utilized for smaller circuit breakers, say, of the order of 800 amperes. It will be kept in mind that any one enclosure or cubicle and any one circuit breaker inserted in that enclosure or cubicle will be for a single particular rating, such as 800 amperes, 600 amperes, or 2,000 amperes. The showing, however, is that the same cradle molding subassembly 801 may be utilized for different ratings of circuit breakers.

Where the circuit breaker cradle is to be connected in a 1,600 ampere circuit breaker, than that is shown at the connector 110a in the center of FIGS. 8 and 10. An elongated strip 813a is used connected by the bolt and nut arrangement 812a to the particular wall 811 defining the opening 806. The strap 813a together with member 820 is a continuous piece of metal forming one half of the terminal connection 110a; the horizontal run 822 forms the other half of the terminal. These terminal sections are connected to the switchboard leads.

The connections from the connecting stud 110a in the cubicle to the buses or other devices in the switchboard utilize the members 813a, 820, 821, 822. Where a still larger circuit breaker should be used having a current-carrying capacity of the order of 2,000 amperes, it is desirable to have a double back connection stud consisting of the elements 110b and 110c. Here, the elements 110b and 110c are in parallel with each other, and are spaced by the spacer 830. The connectors 110b and 110c are extensions of the strap members 821b, 822b and 813b, 820b, respectively, which, in turn, are quite similar to the strap members utilized in the middle section with respect to FIG. 10. Thus, the same molding may be utilized for circuit breakers of a plurality of sizes.

The three poles of a single circuit breaker would be utilized for a single rating. The poles of the circuit breakers of FIGS. 8 and 10 are not intended to be regarded as poles of a different rating.

In FIG. 8, the description, as previously directed to the upper poles of the back connection studs, is also applicable to the arrangements for the lower pole studs 810, 810a, 810b, 810c, extending through the openings 807; in each case these will be identical, and, therefore, no further detailed description is needed. For this reason, the parts in FIG. 8 showing the lower poles have been given the same reference numbers as the parts in FIGS. 8 and 10 showing the upper poles.

The molding is also supplied with a recess 850 to engage (FIG. 8) a hold-down stud 851 in the breaker cubicle, being secured thereto by the bolt 852 so that the cradle molding 801 is accurately positioned in the compartment. Appropriate additional means may be provided for positioning the cradle 800 in the compartment including appropriate openings 900, 900 for securing the cradle to the back wall of the compartment.

As shown in FIG. 9, the rails 802, 803 extend rearwardly of the cradle molding 801 and are bent at right angles to engage a rear wall 860 of the cradle molding 801 to which they may then be secured by a plurality of bolts 861. The rails 802 and the cradle molding 801 are thus integrated to form a rigid frame which supports all the parts of the cradle and, when the circuit breaker is in the cubicle, supports also the circuit breaker by reason of the fact that the rollers 870 of the circuit breaker ride on the rails 802, and at certain times on their extension 805.

The cradle molding 801 is provided with a pair of forwardly projecting front walls 871, 872, and a pair of intermediate forwardly projecting walls 873 and 874. The walls 873 and 874 form interphase barriers within the circuit breaker compartment or cubicle. The additional side walls 871 and 872 serve to strengthen and rigidify the cradle molding. For the same reason, the cradle molding 801 is provided with the top and bottom walls 875 and 876 which, while not strictly necessary for electrical purposes, serves to provide additional reinforcement for the structure.

The sliding rails 804, 805 are extensible outside the cubicle when the cubicle is opened. The circuit breaker when it is entirely within the cubicle rides on the rails 803, 802. When, however, the circuit breaker is to be withdrawn from the housing, the rails 804, 805, slide out from the rails 803, 802, so that the circuit breaker may be withdrawn from the housing without necessarily using a crane or hoist or other support for the circuit breaker while it is being moved clear of the housing. When it is moved clear of the housing on the extension rails 804, 805, then it may be removed in any suitable manner and of course replaced in a reverse operation.

When the circuit breaker is in the housing, it becomes desirable that an external indication be provided for the position of the circuit breaker contacts to indicate whether they are open or closed. In FIG. 7, a structure is shown for achieving this result. The circuit breaker is provided with an actuator 890 connected to the pin 891 which in turn is connected by a link 891a to the circuit breaker jack-shaft 20. The actuator 890 is engaged with the rocker arm 892 which is fixed in the cradle on the pivot 893. The actuator 890 is engaged with the rocker arm 892 in both the test and connected position of the circuit breaker. If the circuit breaker is closed during this engagement, the rocker arm 892 rotates clockwise and the open-ended slot 894 drives the operating arm 895 of the switch 896. It will be noted that the actuating arm 890 has a right angle bend at the bottom and a channel extension 900 which slides onto the end of the rocker arm 892. Since the circuit breaker is inserted into the cubicle with the contacts open and therefore the actuator arm 890 is in the down position, the channel extension 900 will engage the end 901 of the rocker arm 892. Thus, when the circuit breaker is inserted into the cubicle, the end of channel 900 slides onto and engages the end 901 of the rocker arm 892.

The circuit breaker is shown in FIG. 7 in solid lines in the open or tripped position and in dotted lines in the closed position. It will be seen that as the jack-shaft 20 is rotated to move the bridging contact 32 to engage the stationary contact of the circuit breaker, the actuating arm 890 will be raised and the channel extension 900 thereof will lift the end 901 of the arm 892 which pivots on pivot 893. The engagement of slotted end 894 of the rocker arm 892 with the lever 895 on the switch 896 will operate the switch to indicate that the circuit breaker has been moved to the dotted line or closed position.

As is well known, the circuit breaker is tripped before it is withdrawn from engagement with the back connection studs; this causes the actuator arm 890 to move downwardly thereby raising the slotted end 894 of the rocker arm 892 and thereby moving the arm 895 of the switch 896 from the closed position to the open position. In this way, the switch 896 is operated directly by the circuit breaker but is wired out as part of the switchboard thereby providing an indication of the condition of the circuit breaker. The length of the channel extension 900a of the actuating arm 890 of the circuit breaker makes it possible to move the circuit breaker to the test position while still permitting the actuating arm 890 to operate the indicator switch 896.

The extension rails 804, 805, ride on side rails 803, 802, as clearly seen in the end view of FIG. 8. The recesses 904 in extension rails 804, 805, ride on pins 903 supported in the side rails 802, 803.

With the circuit breaker in the connected position (see FIG. 6), the stationary track 802 receives the rear wheel 870 of the circuit breaker in the hook configuration 920 (FIG. 6).

Fixed pivot 893 may also carry a second crank arm 925 (FIG. 7) which is operated as well by the circuit breaker actuating arm 890 when the circuit breaker is in the connected position within the cubicle. Rocker crank arm 925 may be coupled to a flexible cable 926 which runs to another circuit breaker compartment for interlocking purposes. Also, a second flexible cable 936 may be brought in from other compartments and coupled to the trip arm 931 which has a fixed pivot 932. Also connected to the fixed pivot pin 932 is a tripper piece 933 which will hold the circuit breaker tripped when it presses upward on a member 934 which is part of the circuit breaker and coupled directly to the circuit breaker trip latch 73. Thus, two breakers may be interlocked by the two cables so that only one may be closed at a time. Likewise, other interlocks may couple to member 931 at the point 940 to hold the breaker trip free under predetermined conditions.

Referring especially to FIG. 11, the rear molding 800 and the openings 806, 806 for the upper stationary back connection studs and the openings 807, 807 for the lower back connection studs may be provided with a convex front wall 301 toward which the stationary back connection studs from the bus extend from the rear. The convex front wall 301 provides a support and guide for the clam shell shutters which are hereinafter described.

The operation of the clam shell shutters may best be understood from an examination of FIG. 11 in which the clam shell shutters 310 for the upper set of back connection studs and 311 for the lower set are each pivoted for operation on the side of the front wall member 301. The shutter 310 is operable for rotation on the pivot 312 on each side and the shutter 311 is operable for rotation on the pivot 313 on each side. One side of the shutter 311 carries the operating pin 320 which is engaged by the slot 321 in the extension 322 of the bell crank lever 323, which in turn, is pivoted on the stationary pivot 324.

The opposite arm 325 of the bell crank lever 323 has an upturned camming extension 326 which lies over the track 805 on which the circuit breaker rollers 870 roll. The camming extension 326 of the bell crank lever 323 lies over the roller 870 as is shown in this case on the left side of the circuit breaker as the circuit breaker is inserted in the cubicle. When the roller 870 engages the camming extension 326 it causes the bell crank lever 323 to rotate about the pivot 324 thereby driving the pin 320. Bell crank 323 rotates in a counterclockwise direction around the pivot 324. Since the pin 320 is thereby driven to the left and is mounted on the side 330 of the shutter 311, this results in the rotation of the shutter in a clockwise direction about its pivot 313. This operation moves the shutter from a position in which it blocks the openings 807 to a position shown by dotted lines where it leaves these openings unblocked so that the circuit breaker disconnect contacts may enter. Thus, the operation of the bell crank lever 323 directly operates the shutter 311.

A link 340 is connected between the pin 341 on the side 330 of the shutter 311 to the pin 342 on the side 343 of the shutter 310. When the shutter 311 is thereby rotated downwardly or clockwise from the position in which it blocks the openings 807 to the open position the section 341 of the shutter is raised thereby driving link 340 upwardly and thereby driving the pin 342 also upwardly to cause the upper shutter 310 to rotate in a counter-clockwise direction about its pin 312 thereby moving the shutter away from the openings 806 to permit the circuit breaker disconnect contacts at 350 to enter to establish contact. Appropriate biasing means may be provided at any desired location for instance, at the bell crank lever 323 in order to bias the bell crank lever in a clockwise direction so that it will bias the end 326 of the bell crank lever downwardly and thereby bias the shutters toward the closed position. If desired the pins 320 and 342 of the pairs of shutters may be connected by a tension spring in order to achieve the appropriate bias.

A support member 360 mounted on the back molding which is bent forwardly to provide the support member for 301 which carries the pivot 324 of the bell crank lever 323.

It will thus be seen that the two shutter members 310, 311 may be made initially identically. However, one shutter member will have the pin 341 inserted therein located at the rearmost portion thereof, while the other shutter member will have the pin 342 inserted therein on the other side of the pivot 312 from the opening 341a into which the pin 341 may be inserted so that the two shutters will open and close in clam shell fashion.

The shutters sections may be very light, because they are supported by a curved section in 301 and therefore will not impose any noticeable additional resistance to the insertion of the circuit breaker into the cubicle. As shown schematically in FIG. 11, a draw-out circuit breaker will have a disconnected position 350, a test position 350a and a fully inserted position 350b. Since this is a low voltage circuit breaker, the shutter may be operated to the closed position even before the circuit breaker disconnect contacts are moved fully from the position shown at 350b to the position shown at 350a as long as the disconnect contacts 350 have cleared the path of movement of the shutters.

While the disconnect contacts of the circuit breaker have been indicated schematically only with respect to the lower back disconnect contact members, it is obvious that the upper disconnect contact to the circuit breaker will also have the same movement as that shown for the lower disconnect contacts 350.

By this means, therefore, it will be seen that a simplified shutter mechanism is provided for the circuit breaker that is operated in this case by the wheel of the circuit breaker which lifts the camming section 326 of the bell crank lever 323 in order to operate the shutter mechanism. No additional modification or change in the circuit breaker itself is needed since the wheel itself is required in order that the circuit breaker ride on appropriate rails in the cubicle. Where other types of support for the circuit breaker in the cubicle are required, then a cam operating extension similar to the wheel 870 may be provided on the side of the circuit breaker in order to operate the cam arm 326 of the bell crank lever 323.

As stated above, the shutter members 310, 311 may be very light in weight, owing to the fact that they are made stiff by their curved cross-section. This lightness of the shutters makes it possible to insert and withdraw the circuit breaker without any appreciable extra effort required for the operation of the shutters.

In the foregoing, the present invention has been described solely in connection with preferred illustrative embodiments thereof. Since many variations and modifications of the present invention will be obvious to those skilled in the art it is preferred that the scope of this disclosure be determined not by the specific illustrative embodiments herein contained but only the the appended claims.

What is claimed is:

1. A circuit breaker compartment having a front through which a circuit breaker may be inserted and removed;
    a plurality of stationary disconnect members at the rear of said compartment comprising at least one upper stationary disconnect contact and at least one lower stationary disconnect contact;
    a shutter structure at the rear of said compartment comprising a clam-shell arrangement of a pair of shutter halves;
    one of said clam-shell halves being pivotally mounted to extend across the rear of said compartment in front of said upper stationary disconnect contact;
    the second of said clam-shell halves being pivotally mounted to extend across the rear of said compartment in front of said lower stationary disconnect contact means connecting said halves together so that they are simultaneously movable;
    said clam-shell halves being movable simultaneously toward each other to be positioned in front of their respective stationary contacts and being movable simultaneously away from each other to provide access to their respective stationary contacts.

2. The circuit breaker compartment and shutter of claim 1 wherein one of said shutters is provided with a link on one side of its pivotal mounting; said link being connected to said second shutter on the other side of the pivotal mounting of the second shutter; rotation of one shutter about its pivotal mounting in one direction causing rotation of said second shutter about its pivotal mounting in the opposite direction.

3. The circuit breaker compartment and shutter of claim 2 wherein said shutters are biased toward each other and to a position in front of their respective contacts.

4. The circuit breaker compartment and shutter of claim 1 wherein the rear of said compartment is provided with an insulated back having openings; said contacts being accessible through said openings; said one of said shutters being provided with a link on one side of it pivotal mounting; said link being connected to said second shutter on the other side of the pivotal mounting of the second shutter; rotation of one shutter about its pivotal mounting in one direction causing rotation of said second shutter about its pivotal mounting in the opposite direction.

5. The circuit breaker compartment and shutter of claim 4 wherein, the front surface of the insulated back at the openings through which said contacts are accessible and the two halves of the clam-shell shutter are correspondingly curved.

6. The circuit breaker compartment and shutter of claim 5 wherein, the shutter halves are slidable along the curved surfaces of the insulated back.

7. The circuit breaker compartment and shutter of claim 6 wherein said shutters are biased toward each other and to a position in front of their respective contacts.

8. The circuit breaker compartment and shutter of claim 7 wherein said compartment has a pair of tracks extending from the rear to the front thereof; a circuit breaker; said circuit breaker being movable toward and away from said rear wall along said tracks;
    an operating member in said compartment extending in the path of movement of said circuit breaker;
    said operating member being connected to said one of said shutters;
    a portion of said circuit breaker engaging said operating member and moving said one shutter from its biased closed position to an open position as the circuit breaker is moved into said compartment; said link moving said second shutter to an open position in response to movement of said one shutter.

9. The circuit breaker compartment and shutter of claim 8 in which said operating member comprises a bell crank lever having one end operatively connected to said one shutter and the other end comprising a cam portion overlying one of said tracks; said circuit breaker having wheels riding on said tracks; one of said wheels engaging said cam portion of said bell crank lever to operate said shutters as the circuit breaker is moved toward the rear of the compartment.

* * * * *